(12) United States Patent
Edney

(10) Patent No.: US 11,527,175 B2
(45) Date of Patent: Dec. 13, 2022

(54) MOBILE CARDIOPULMONARY RESUSCITATION TRAINING SYSTEM AND METHODS OF MAKING AND USING SAME

(71) Applicant: Timika Sharee Edney, Darby, PA (US)

(72) Inventor: Timika Sharee Edney, Darby, PA (US)

( * ) Notice: Subject to any disclaimer, the term of this patent is extended or adjusted under 35 U.S.C. 154(b) by 65 days.

(21) Appl. No.: 17/168,294

(22) Filed: Feb. 5, 2021

(65) Prior Publication Data

US 2022/0254278 A1  Aug. 11, 2022

(51) Int. Cl.
*G09B 23/28* (2006.01)

(52) U.S. Cl.
CPC ................ *G09B 23/288* (2013.01)

(58) Field of Classification Search
CPC ............... G09B 23/28; G09B 23/288
See application file for complete search history.

(56) References Cited

U.S. PATENT DOCUMENTS

| | | | |
|---|---|---|---|
| 2009/0035740 A1* | 2/2009 | Reed | G09B 23/288 607/5 |
| 2013/0330700 A1* | 12/2013 | Feins | G09B 23/30 434/267 |
| 2014/0330579 A1* | 11/2014 | Cashman | G06Q 10/1095 705/2 |

* cited by examiner

*Primary Examiner* — Timothy A Musselman
(74) *Attorney, Agent, or Firm* — James R. McDaniel

(57) ABSTRACT

A cardiopulmonary resuscitation (CPR)/automatic external defibrillator (AED) training system, wherein the CPR/AED training system includes a cabinet having an upper cabinet and a lower cabinet, an audio/visual monitor located in the upper cabinet, a photo camera located in the upper cabinet and located adjacent to the audio/visual monitor, a computer located in the upper cabinet and operatively connected to the audio/visual monitor and the photo camera, and a first and second mannequin station operatively connected to the lower cabinet, wherein the first and second mannequin stations can be used in conjunction with each other for CPR/AED training.

12 Claims, 1 Drawing Sheet

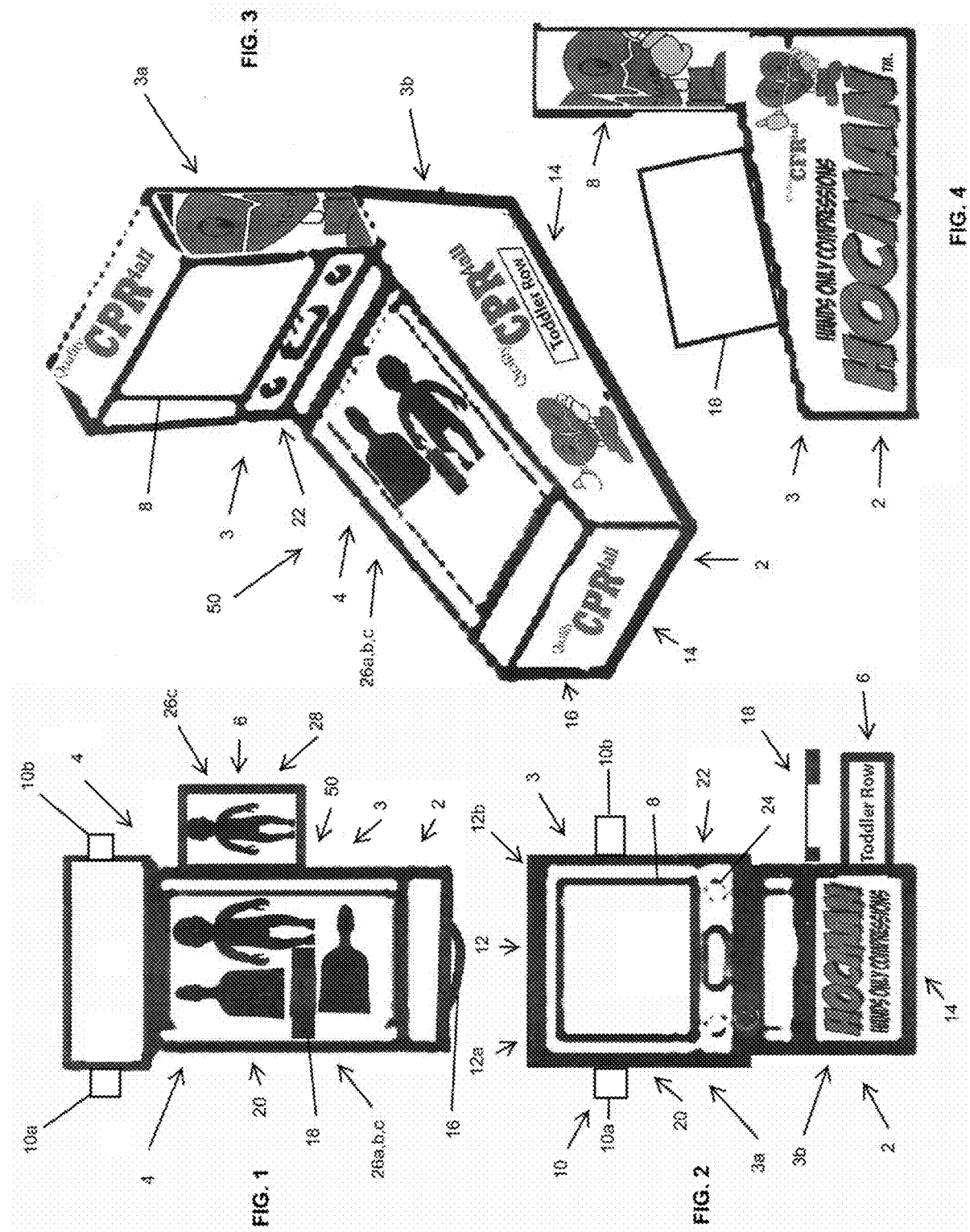

MOBILE CARDIOPULMONARY RESUSCITATION TRAINING SYSTEM AND METHODS OF MAKING AND USING SAME

FIELD OF THE INVENTION

The present invention is generally related to an improved all-in-one, mobile, cardiopulmonary resuscitation (CPR) training system. The CPR training system is capable of providing practical, hands on CPR training using blended (synchronous and asynchronous) learning models. Furthermore, the CPR training system includes emergency response training with educational updates. Finally, the CPR training system station can include automatic external defibrillator (AED) training and a sanitizing station.

BACKGROUND OF THE INVENTION

Prior to the present invention, as set forth in general terms above and more specifically below, it is known that current CPR training requires all personnel who are learning CPR ("students") to kneel beside the mannequin for adult/child skills training. However, child training mannequins are underutilized for training because the "adult/child" response follows the same (identical) actions. In fact, most students have never seen or trained with child mannequins due to this cost-effective bundling. With respect to infant CPR training, this type of training is a separate option and can be performed on a table. However, each option has additional fees associated with the training.

Furthermore, it is known that in the United States, someone dies from cardiovascular disease every 40 seconds. Also, in that same 40 seconds, someone suffers a stroke. Time is of the essence in treating cardiovascular and stroke conditions. Yet, in far too many cases, a fragmented care system prevents patients from receiving the treatments that can save their lives. Moreover, sudden cardiac arrest (SCA) is a leading cause of death in the United States. But, when ordinary people, not just doctors and emergency medical technicians (EMTs), are equipped with the skills to perform CPR and use automatic external defibrillators (AEDs), the survival rate can double—or even triple.

It is also known that public schools are battling severe budget crises and many school programs have been eliminated. More are expected due to new training equipment compliance. A lack of funds for new purchasing equipment and reduced student graduate skills leaves school aged students vulnerable. More importantly, public schools are facing serious concerns regarding school staff and appropriate on-site basic life support (BLS) trained staff during school hours. Possible solutions could be found within an oversight of student potential to employ quality CPR skills with career development.

With respect to out-of-hospital cardiac arrest (OHCA), OHCA affects approximately 350,000 victims annually in the United States. Given that OHCA has an annual death incidence of 132 per 100,000 population, communities of all sizes should prepare a system of care for the eventual OHCA event. Organized community programs that prepare the lay public to provide bystander CPR and early defibrillation offer the best opportunity for successful resuscitation in the initial minutes after an OHCA and represent the community link in the OHCA chain of survival.

It is further known that traditional CPR training equipment is individually sold with quantity bundling available. Moreover, certain training equipment without objective student feedback devices available is considered outdated, according to new American Hospital Association (AHA) requirements, effective January 2019. Yet, this equipment is still being used by instructors, as compliance monitoring is rare. Therefore, this known CPR equipment fails in service delivery and creates significant financial investments for both corporations and instructors. Additionally, despite a minimum $1000+ investment as an instructor, the equipment, materials and supplies have to be physically transported both to and from every class that is taught. This creates a logistical, physical, and financial burden for instructors.

It is also known to use CPR training kiosks at select airports, which require a traditional kneeling position for the student. This positional training requirement is dated, limits rescuer potential, and is undesired for many students, especially during a pandemic. Furthermore, these CPR training kiosks fail to offer effective, universal positional options such as vertical or sitting positional options.

Furthermore, CPR kiosks, traditional CPR classrooms, and onsite CPR training options emphasize single rescuer skills for registered students in predetermined locations, thereby limiting outreach potential. Also, the current equipment typically represents adult males only. Consequently, this fails to provide a true rescuer skill practicum within individual communities (both personal and professional).

Moreover, overall student feedback regarding typical CPR classes is that the classes are boring, have long class times, are inconsiderate, provide an unwelcoming appearance, and/or make the students feel "kidnapped" or tempted to take a nap. This is because traditional CPR training fails to consider outreach for all geographical locations, equity, inclusion, skills development and progressive, social learning, and/or the student's preferred accommodations. Furthermore, additional skill training requires another scheduled class. Otherwise, Skills-only refreshers are available and scheduled only for healthcare providers active in hospital settings during the two-year traditional post training timeframes. Combined failures include social mastery competition omission, repetitive costs for identical service(s), and universal rescuer outreach to improve service delivery.

Finally, children and individuals with disabilities seeking CPR knowledge and skills training face significant obstacles when required to schedule/pay for class, or even a perceived mental and/or physical disability that would exclude one from training without a chance to ever even attempt to learn or practice lifesaving skills. These ideas and requirements have become significant barriers and must be overcome to allow any potential rescuer an opportunity to obtain the necessary CPR skill training with or without certification aka certificate of completion. Furthermore, the current CPR training systems fail to be available for school children, despite current high school graduation requirements for CPR/AED curriculum.

COVID19: Coronavirus pandemic 2020—disrupted traditional CPR/AED outreach and services. Further mandates and guidelines to incorporate safety modifications and precautions have been included to continue service delivery.

BRIEF SUMMARY OF THE INVENTION

The present invention combines currently existing cardiopulmonary resuscitation (CPR) training products with updated feedback enabled mannequins and an automatic external defibrillator (AED) trainer with overhead and interactive audio-visual displays (music, video, and recording) into a family training platform via an additional concealed toddler storage station to support youth training, as well as individuals with disabilities. The present invention has elevated both training platforms to allow vertical (standing) and/or seated positions for skills training.

The present invention also provides the following advantages over the known CPR training products:

1.) The present invention modernizes CPR training by empowering bystanders to become rescuers by providing hands-only CPR (HOC) and AED skill development.
2.) The present invention provides a mobile CPR classroom which can support any student seeking training in any environment. This allows for global access and opportunities for anyone willing to learn.
3.) The present invention provides for updated, compliant, manufacturer training equipment.
4.) The present invention provides for generational and gender inclusion.
5.) The present invention provides social learning which includes relevant music to support skill training.
6.) The present invention provides social incentives such as selfies of completions (SOC's).
7.) The present invention provides the ability for single and/or multi-rescuer training which enables a single/group HOC (blended) synchronous/asynchronous learning training solution.
8.) The present invention helps reduce costs associated with providing CPR to the individuals who want to obtain the CPR skill training, especially in schools.
9.) The present invention eliminates traditional kneeling and avoids floor training.

The preferred mobile, cardiopulmonary resuscitation (CPR)/automatic external defibrillator (AED) training system, according to various embodiments of the present invention, offers the following advantages: ease of use; improved CPR training; improved AED training; improved learning experience; mobility; ease of set up and take down; ease of transportation; ability to train a variety of class sizes; reduced CPR training costs; and the ability to provide gender and generation training. In fact, in many of the preferred embodiments, these advantages are optimized to an extent that is considerably higher than heretofore achieved in prior, known cardiopulmonary resuscitation (CPR)/automatic external defibrillator (AED) training systems.

It is a purpose of this invention to fulfill these and other needs in the mobile CPR/AED training art in a manner more apparent to the skilled artisan once given the following disclosure.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 1 is a schematic, top view of a mobile CPR/AED training system, constructed according to the present invention;

FIG. 2 is a schematic, front view of the mobile CPR/AED training system, constructed according to the present invention;

FIG. 3 is a schematic, isometric view of the mobile CPR/AED training system, constructed according to the present invention; and FIG. 4 is a schematic, side view of the mobile CPR/AED training system, constructed according to the present invention.

DETAILED DESCRIPTION OF THE PREFERRED EMBODIMENTS OF THE INVENTION

In order to address the shortcomings of the prior, known cardiopulmonary resuscitation (CPR)/automatic external defibrillator (AED) training systems, it would be desirable to utilize an improved, all-in-one, mobile, cardiopulmonary resuscitation (CPR) training system. The CPR training system is capable of providing practical, hands on CPR training using blended (synchronous and asynchronous) learning models. Furthermore, the CPR/AED training system includes emergency response training with educational updates. Finally, the CPR/AED training system station can include automatic external defibrillator (AED) training and a sanitizing station.

Reference is made now to FIGS. 1-4, where there is illustrated a mobile, cardiopulmonary resuscitation (CPR)/automatic external defibrillator (AED) training system 2, wherein the mobile, cardiopulmonary resuscitation (CPR)/automatic external defibrillator (AED) training system 2 includes, in part, cabinet 3, embedded monitored mannequin "Family" station 4, storable infant station "Toddler Row" 6, audio/visual (AV) monitor 8, optional non-touch point-of-sale (POS) and user registration devices 10 (including non-touch point-of-sale (POS) device 10a and user registration device 10b), video/photo camera and printer assembly 12 (including video/photo camera 12a and printer assembly 12b), advertising 14, handle 16, acrylic safety barriers 18 and sanitizing station 50. Preferably, handle 16 is constructed of any suitable durable, high strength, lightweight material that will allow the user to grab handle 14 and easily transport cardiopulmonary resuscitation (CPR)/automatic external defibrillator (AED) training system 2. Preferably, advertising 14 is any conventional advertising, logo, or other similar graphical design(s). Preferably, safety barriers 18 are constructed of any suitable, durable, UV resistant, high strength, lightweight, polymeric material. Preferably, sanitizing station 50 is located adjacent to the embedded monitored mannequin "Family" station 4 and can be attached to at least one of the acrylic safety barriers 18. It is to be understood that sanitizing station 50 can include, but is not limited to, a mounted non touch temperature detector, a hand sanitizing dispenser, mannequin wipes, and/or paper towels.

The mobile, cardiopulmonary resuscitation (CPR)/automatic external defibrillator (AED) training system 2 is a custom built, wooden cabinet 3 designed to resemble traditional multi-player arcade games like the famous 1980's PACMAN™ arcade game. Using gaming elements to enable social learning, the mobile, cardiopulmonary resuscitation (CPR)/automatic external defibrillator (AED) training system 2 enables lifesaving knowledge and skills training with social mastery competition, thereby providing effective training for synchronous and/or asynchronous learning ("blended learning gamification").

The cabinet 3 combines two separate sections (upper cabinet 3a and lower cabinet 3b) with advertising 14. The upper cabinet 3a includes, in part, audio/visual (AV) monitor 8, non-touch point-of-sale device (POS) 10a and user registration device 10b, video/photo camera 12a and printer assembly 12b, a conventional computer 20 having a built-in DVD player, and a conventional audio receiver 22. It is to be understood that the upper cabinet 3a should also include conventional cooling fans and electrical connectors (not shown) to cool and power the computer 20 and audio receiver 22. Also, it is to be understood that computer 20 should be capable of being connected to a conventional communications network such as the Internet through a conventional wireless connection such as Wi-Fi or the like. Finally, computer 20 can include a conventional database and a DVD player (not shown) in which music, apps, or other similar data for use in providing the CPR/AED training can be stored and subsequently played/utilized by the user.

Regarding audio/visual (AV) monitor 8, conventional non-touch point-of-sale (POS) device 10a and user registration device 10b, and video/photo camera 12a and printer assembly 12b, audio/visual (AV) monitor 8 is attached to upper cabinet 3a by conventional fasteners. Also, conventional non-touch point-of-sale (POS) device 10a and user registration device 10b are attached to upper cabinet 3a by conventional fasteners. In particular, a non-touch point-of-sale (POS) 10a can be attached on one side of the upper cabinet 3a and a user registration device 10b can be attached to the other side of the upper cabinet 3a. Finally, video/photo camera 12a and printer assembly 12b are attached to upper cabinet 3a by conventional fasteners. It is to be understood that non-touch point-of-sale (POS) device 10a and user registration device 10b are conventionally connected together so that the non-touch point-of-sale (POS) device 10a and user registration device 10b can interact with each other in order to allow the user to register for the CPR/AED skill training and pay for the CPR/AED training.

As will be described in greater detail later, audio/visual (AV) monitor 8 is used to provide a viewing screen for the user. Also, non-touch point-of-sale (POS) device 10a and user registration device 10b can be used to allow the user to register for the CPR/AED training session and then pay for the CPR/AED training session. In particular, non-touch point-of-sale (POS) device 10a and user registration device 10b can be a conventional POS device 10a and a conventional user registration device 10b such as a keyboard or other similar device that allows the user to enter the users registration information. Further, the video/photo camera 12a and printer assembly 12b allow the user to take pictures/videos of the user once the user has completed the CPR/AED training session ("Selfies of Completion-SOC") and print the SOC picture(s). Finally, it is to be understood that audio/visual (AV) monitor 8, conventional non-touch point-of-sale (POS) device 10a and user registration devices 10b, and video/photo camera 12a and printer assembly 12b are conventionally electrically connected to computer 20 and audio receiver 22.

With respect to the lower cabinet 3b, the lower cabinet 3b includes, in part, elevated, embedded monitored mannequin "Family" station 4, storable infant station "Toddler Row" 6, acrylic safety barriers 18, and audio speakers 24. It is to be understood that elevated, embedded monitored mannequin "Family" station 4 is conventionally attached to the lower cabinet 3b by conventional fasteners. Also, audio speakers 24 are conventionally attached to the lower cabinet 3b by conventional fasteners. Finally, elevated, embedded monitored mannequin "Family" station 4, is embedded into the lower cabinet 3b to provide a firm, flat surface that is required to effectively perform chest compressions during the CPR/AED training while standing.

A unique aspect of the present invention is the use of mannequins 26a-26c. Preferably, mannequin 26a is a representation of the upper torso and head of an adult. Mannequin 26b is a representation of the upper torso and head of a child. Mannequin 26c is a representation of the upper torso and head of an infant. Furthermore, the mannequins 26a-26c can provide audio and visual feedback to the user to let the user know if the user is performing the CPR/AED training procedure correctly. Moreover, certified instructors may provide additional quality assurance with student monitoring to obtain desired certification, if needed. It is to be understood that the mannequins 26a-26c are conventionally equipped with a computer (not shown) and universal CPR/AED training pads (not shown) and electrical wiring (not shown) that electrically connects the computer with the universal CPR/AED training pads. The computer associated with the mannequins 26a-26c can be used to provide feedback to the user regarding the CPR/AED skill training that the user is attempting to perform on the mannequins 26a-26c, as is well known in the art. Furthermore, it is to be understood that mannequins 26a-26c can be used in conjunction with each other during the CPR/AED skill training.

Another unique aspect of the present invention is the lower, slidable, pull-out drawer 28 that is capable of containing another infant mannequin 26c. In particular, lower, slidable, pull-out drawer 28 provides an additional storage space in which another infant mannequin 26c can be stored for later use in case more than one user is performing the infant CPR/AED training on cardiopulmonary resuscitation (CPR)/automatic external defibrillator (AED) training system 2.

A still another unique aspect of the present invention is the optional use of safety barriers 18. In particular, barriers 18 can be attached on various locations on cardiopulmonary resuscitation (CPR)/automatic external defibrillator (AED) training system 2. The barriers 18 can be placed on cardiopulmonary resuscitation (CPR)/automatic external defibrillator (AED) training system 2 in order control the transmission of respiratory droplets and aerosols from the person using the cardiopulmonary resuscitation (CPR)/automatic external defibrillator (AED) training system 2 onto the cardiopulmonary resuscitation (CPR)/automatic external defibrillator (AED) training system 2. For example, a barrier 18 can be located between the elevated, embedded monitored mannequins "Family" station 4. As shown in FIG. 4, the location of barrier 18 will allow more than one user to interact with the elevated, embedded monitored mannequin "Family" station 4. As shown in FIG. 1, a barrier 18 is located between adult mannequin 26a and child mannequin 26b. As shown in FIG. 3, a barrier 18 can be located between adult mannequin 26a and infant mannequin 26c. A barrier 18 can also attached inside the storable infant station "Toddler Row" 6. In this manner, when the storable infant station "Toddler Row" 6 is pulled out of the lower cabinet, the barrier 18 can be used in order to control the transmission of respiratory droplets and aerosols from other users.

Using the Cardiopulmonary Resuscitation (CPR) Training System

During the use of cardiopulmonary resuscitation (CPR)/automatic external defibrillator (AED) training system 2, attention is directed to FIGS. 1-4. It is to be understood that the cardiopulmonary resuscitation (CPR)/automatic external defibrillator (AED) training system 2 features relevant generational music playlists emphasizing 100-120 beats-per-minute (BPM) HOC skill development, an audio/visual (AV) monitor 8 monitor that is capable of showing public service announcement (PSA) knowledge messages, a video/photo camera 12a and printer assembly 12b that includes a "Live" camera that is available to photograph and/or record skills practice sessions as multiple users (1-4 maximum individuals) practice a skill until the selected "compression beat" ends. Typically, the length of a "compression beat" is around three (3) minutes so the individuals should be expected to practice the skill for around 3 minutes.

In order to initiate a training session, the user may enter his/her registration information into the optional user registration device 10b. The user then can use the optional non-touch point-of-sale (POS) 10a to pay for the training session. It is to be understood that the user may have already registered and paid for the training session so the user simply has to enter a conventional password or other similar code into the optional user registration device 10b in order to begin the training session.

Once the training session has been initiated, the user can then follow the instructions on the audio/visual (AV) monitor 8 in order to participate in the training session. As discussed above, the mannequins 26a-26c are equipped with audio and visual feedback to inform the user as to whether or not the user is practicing the CPR/AED training skill on the mannequins 26a-26c correctly. Alternatively, a certified instructor can lead desired course modules using present invention.

Social incentives allow the user to activate video/photo camera 12a in order to take a picture or a video of the training session and create a "Selfie of Completion" (SOC) at any time during CPR/AED training. The printer assembly 12b can then be used to print the SOC or a digital file for social sharing can be conventionally created through the use of the computer 20 and the DVD player.

As discussed above, it is to be understood that the CPR/AED training using the cardiopulmonary resuscitation (CPR)/automatic external defibrillator (AED) training system 2 usually takes about three (3) minutes of CPR skills training per user. Another unique aspect of the present invention is that the cardiopulmonary resuscitation (CPR)/automatic external defibrillator (AED) training system 2 can offer both asynchronous (hands-on-compression knowledge and training only) and synchronous training (certified CPR Instructor to lead and monitor the skills session in compliance with the user's selected training module). Moreover, certified instructors may provide additional quality assurance with student monitoring to obtain desired certification, if needed.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "anterior", "posterior", "top" and "bottom", as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

Therefore, provided herein is a new and improved mobile, cardiopulmonary resuscitation (CPR)/automatic external defibrillator (AED) training system, which according to various embodiments of the present invention, offers the following advantages: ease of use; improved CPR training; improved AED training; improved learning experience; mobility; ease of set up and take down; ease of transportation; ability to train a variety of class sizes; reduced CPR training costs; and the ability to provide gender and generation training.

In fact, in many of the preferred embodiments, these advantages of ease of use, improved CPR training, improved AED training, improved learning experience, mobility, ease of set up and take down, ease of transportation, ability to train a variety of class sizes, reduced CPR training costs, and the ability to provide gender and generation training are optimized to an extent that is considerably higher than heretofore achieved in prior, known cardiopulmonary resuscitation (CPR)/automatic external defibrillator (AED) training systems.

I claim:

1. A cardiopulmonary resuscitation (CPR) training system, wherein the CPR training system comprises:
   a cabinet having an upper cabinet and a lower cabinet;
   an audio/visual monitor located in the upper cabinet;
   a photo camera located in the upper cabinet and located adjacent to the audio/visual monitor;
   a computer located in the upper cabinet and operatively connected to the audio/visual monitor and the photo camera;
   a first mannequin station operatively connected to the lower cabinet, wherein the first mannequin station can be used for CPR training; and
   a slidable, pull-out drawer which is located within the lower cabinet, wherein the slidable, pull-out drawer includes a second mannequin station and wherein the second mannequin station can be used for CPR training in conjunction with the first mannequin station, and
   wherein the first mannequin station further includes an adult mannequin, a child mannequin, and a first infant mannequin located within the first mannequin station, and the second mannequin station includes a second infant mannequin located within the second mannequin station.

2. The cardiopulmonary resuscitation (CPR) training system, according to claim 1, wherein the CPR training system further comprises:
   a point-of-sale (POS) device operatively connected to the upper cabinet; and
   a user registration device operatively connected to the point-of-sale (POS) device and the upper cabinet.

3. The cardiopulmonary resuscitation (CPR) training system, according to claim 1, wherein the CPR training system further comprises:
   a printer located in the upper cabinet and operatively connected to the photo camera and the computer.

4. The cardiopulmonary resuscitation (CPR) training system, according to claim 1, wherein the CPR training system further comprises:
   an audio receiver located in the upper cabinet and operatively connected to the computer.

5. An automatic external defibrillator (AED) training system, wherein the AED training system comprises:
   a cabinet having an upper cabinet and a lower cabinet;
   an audio/visual monitor located in the upper cabinet;
   a photo camera located in the upper cabinet and located adjacent to the audio/visual monitor;
   a computer located in the upper cabinet and operatively connected to the audio/visual monitor and the photo camera;
   a first mannequin station operatively connected to the lower cabinet, wherein the first mannequin station can be used for AED training; and
   a slidable, pull-out drawer which is located within the lower cabinet, wherein the slidable, pull-out drawer includes a second mannequin station and wherein the second mannequin station can be used for AED training in conjunction with the first mannequin station, and
   wherein the first mannequin station further includes an adult mannequin, a child mannequin, and a first infant mannequin located within the first mannequin station, and the second mannequin station includes a second infant mannequin located within the second mannequin station.

6. The automatic external defibrillator (AED) training system, according to claim 5, wherein the AED training system further comprises:
   a point-of-sale (POS) device operatively connected to the upper cabinet; and
   a user registration device operatively connected to the point-of-sale (POS) device and the upper cabinet.

7. The automatic external defibrillator (AED) training system, according to claim 5, wherein the AED training system further comprises:
   a printer located in the upper cabinet and operatively connected to the photo camera and the computer.

8. The automatic external defibrillator (AED) training system, according to claim 5, wherein the AED training system further comprises:
   an audio receiver located in the upper cabinet and operatively connected to the computer.

9. A method of constructing a cardiopulmonary resuscitation (CPR)/automatic external defibrillator (AED) training system, wherein the CPR/AED training system comprises:
   providing a cabinet having an upper cabinet and a lower cabinet;
   attaching an audio/visual monitor to the upper cabinet;
   attaching a photo camera to the upper cabinet, wherein the photo camera is located adjacent to the audio/visual monitor;
   attaching a computer to the upper cabinet, wherein the computer is operatively connected to the audio/visual monitor and the photo camera;
   attaching a first mannequin station to the lower cabinet, wherein the first mannequin station can be used for CPR and AED training;
   attaching a slidable, pull-out drawer within the lower cabinet, wherein the slidable, pull-out drawer includes a second mannequin station and wherein the second mannequin station can be used for CPR and AED training in conjunction with the first mannequin station;
   providing the first mannequin station with an adult mannequin, a child mannequin, and a first infant mannequin; and
   providing the second mannequin station with a second infant mannequin.

10. The method, according to claim 9, wherein the method further comprises:
   attaching a point-of-sale (POS) device to the upper cabinet; and
   attaching a user registration device to the point-of-sale (POS) device and the upper cabinet.

11. The method, according to claim 9, wherein the method further comprises:
   attaching a printer in the upper cabinet, wherein the printer is operatively connected to the photo camera and the computer.

12. The method, according to claim 9, wherein the method further comprises:
   attaching an audio receiver in the upper cabinet, wherein the audio receiver is operatively connected to the computer.

* * * * *